United States Patent
Ozawa et al.

(10) Patent No.: US 7,378,752 B2
(45) Date of Patent: May 27, 2008

(54) VEHICLE ANTITHEFT DEVICE

(75) Inventors: Takao Ozawa, Toyota (JP); Shinichi Tanaka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 0 days.

(21) Appl. No.: 10/540,274

(22) PCT Filed: Dec. 25, 2003

(86) PCT No.: PCT/JP03/16778

§ 371 (c)(1),
(2), (4) Date: Feb. 27, 2007

(87) PCT Pub. No.: WO2004/058547

PCT Pub. Date: Jul. 15, 2004

(65) Prior Publication Data

US 2007/0182250 A1   Aug. 9, 2007

(30) Foreign Application Priority Data

Dec. 26, 2002   (JP) .............................. 2002-378292

(51) Int. Cl.
*B60R 25/00* (2006.01)
(52) U.S. Cl. .................................... 307/10.2
(58) Field of Classification Search ................ 307/10.2
See application file for complete search history.

(56) References Cited

U.S. PATENT DOCUMENTS

| | | | |
|---|---|---|---|
| 4,958,084 A * | 9/1990 | Carlo et al. ................. | 307/10.2 |
| 4,963,856 A | 10/1990 | Yukitomo | |
| 5,942,988 A * | 8/1999 | Snyder et al. ......... | 340/825.69 |
| 5,977,654 A * | 11/1999 | Johnson et al. ............ | 307/10.3 |
| 6,191,703 B1 * | 2/2001 | Wallace ................. | 340/825.69 |
| 6,639,511 B2 | 10/2003 | Haruna et al. | |

FOREIGN PATENT DOCUMENTS

| | | |
|---|---|---|
| JP | 61-111863 | 7/1986 |
| JP | 63-269759 | 11/1988 |

(Continued)

*Primary Examiner*—Robert L. Deberadinis
(74) *Attorney, Agent, or Firm*—Kratz, Quintos & Hanson, LLP (57) ABSTRACT

A vehicle antitheft device prevents an erroneous activation of a theft preventing function due to an activation of a system, which is capable of starting an engine in a state where a key is not inserted in an ignition key cylinder. A power source control device causes a starter motor to start the engine when the key is inserted into the ignition key cylinder or an authentication collation through a radio communication is completed. The vehicle antitheft device activates an alarm when an IG signal from the power source control device becomes an ON signal in an uninserted state of the key into the ignition key cylinder. A push start switch, which is push-operated at a time of an engine start, is connected to the power source control device and the vehicle antitheft device. The power source control apparatus turns an ACC signal and the IG signal supplied to the vehicle antitheft device to an ON state in that order when the collation with the portable equipment through a radio communication is completed after an operation of the push start switch. The vehicle antitheft device changes a security function to an unvigilant state when the ACC signal is changed to an ON state.

8 Claims, 4 Drawing Sheets

FOREIGN PATENT DOCUMENTS

| | | |
|---|---|---|
| JP | 7-156754 | 6/1995 |
| JP | 11-091508 | 4/1999 |
| JP | 2002-70698 | 3/2002 |
| JP | 2002-79911 | 3/2002 |
| JP | 2002-130034 | 5/2002 |

* cited by examiner

VEHICLE ANTITHEFT DEVICE

TECHNICAL FIELD

The present invention relates to vehicle antitheft devices and, more particularly, to a vehicle antitheft device, which is mounted on a vehicle equipped with a starting apparatus for starting an engine based on a result of collation with a portable equipment through a radio communication, for actuating a predetermined vehicle theft preventing function so as to prevent the vehicle from being theft.

BACKGROUND ART

There is known a vehicle antitheft device that disables a start of an engine at a set mode for a vehicle theft preventing operation of the a vehicle and enables a start of the engine by canceling the set mode when a key is inserted into an ignition key cylinder and a conduction of an ignition switch is detected in the above-mentioned state (For example, refer to Japanese Laid-Open Patent Application No. 7-156754). In such a vehicle antitheft device, when a normal starting operation is performed, a theft preventing function is canceled. For this reason, according to the above-mentioned conventional antitheft device, it is avoidable that the situation where the theft preventing function operates due to a normal starting operation is avoidable.

By the way, there exists an ignition system that performs an engine start when a collation between an in-vehicle equipment attached to a vehicle and a portable equipment carried by a vehicle driver is completed through a radio communication and an operation of an engine start switch provided in the vehicle is performed. In such as system, it is required to enable a start of an engine by an ignition switch being conducted even if a key is not inserted into the ignition key cylinder. For this reason, in a vehicle having both the ignition system and the vehicle antitheft device disclosed in the above-mentioned patent document, there may be a situation where the theft preventing function cannot be cancelled even when a normal start operation is performed. Therefore, convenience of a vehicle driver may be deteriorated due to the theft preventing function being activated.

DISCLOSURE OF THE INVENTION

It is a general object of the present invention to provide an improved and useful vehicle antitheft device in which the above-mentioned problems are eliminated.

A more specific object of the present invention is to provide a vehicle antitheft device that is capable of preventing an erroneous activation of a theft preventing function due to an activation of a system that can start an engine without inserting a key into an ignition key cylinder.

In order to achieve the above-mentioned object, there is provided according to the present invention a vehicle antitheft device mounted on a vehicle having a start device that starts an engine when a collation between an in-vehicle equipment and a portable equipment through a radio communication is completed and an operation of a start operation means is performed, the vehicle antitheft device actuating a predetermined theft preventing function so as to prevent the vehicle from being thieved, the vehicle antitheft device comprising: in-vehicle equipment current supplying means for supplying an electric current to an in-vehicle electric equipment under a condition where said collation is completed before an engine start is performed by said start device in the vehicle; and activation limiting means for limiting an activation of said predetermined theft preventing function when a current supply to the in-vehicle electric equipment by the in-vehicle equipment current supplying means is started.

In the present invention, the start device starts the engine when the collation between the in-vehicle equipment and the portable equipment according to a radio communication is completed and an operation of the start operation means is performed. Additionally, the in-vehicle electric equipment is supplied with an electric current under a condition of completion of the collation between the in-vehicle equipment and the portable equipment through a radio communication. After such a current supply is started, the predetermined theft preventing function is limited and an unvigilant state is set. Therefore, the activation limitation of the predetermined theft preventing function is achieved before the engine is started. For this reason, according to the present invention, an erroneous activation of the theft preventing function due to the engine start by the start device based on a radio communication can be prevented.

It should be noted that, in the present invention, the "in-vehicle electric equipment" is an accessory part or the like that is mounted on the vehicle other than the start device which performs a start of the engine.

By the way, the collation between the in-vehicle equipment and the portable equipment through a radio communication is completed in a short period of time.

Accordingly, in the vehicle antitheft device according to the present invention, the start operation means may be a start switch that is operated to be a current supply permitting state to the in-vehicle electric equipment and a start permitting state of the engine stepwisely in that order; the in-vehicle equipment current supplying means may permit a current supply to the in-vehicle electric equipment by being operated to be in the current supply permitting state to the in-vehicle electric equipment; and the activation limiting means may limit the predetermined theft preventing function when the current supply to the in-vehicle electric equipment by the in-vehicle equipment current supplying means is started within a predetermined time period after the start operation means is operated to be in the current supply permitting state to said in-vehicle electric equipment. Thus, since an activation of the theft preventing function is not limited even if a start of a current supply is performed after the predetermined time period, an anti-theft property according to the activation of the theft preventing function can be maintained high.

It should be noted that, in the vehicle antitheft device, the start operation means may be a push-type start switch, provided in the vehicle, which is pressed down by a vehicle driver.

Additionally, in the vehicle antitheft device according to the present invention, the vehicle may be equipped with a mechanical start device that starts the engine when an ignition operation is performed in a state where a key is inserted in an ignition key cylinder, and said predetermined theft preventing function may include at least a function to give warning when a turn-on of an ignition is detected in a state where said key is not inserted in said ignition key cylinder. Accordingly, Although a situation where an ignition is turned on in a state where the key is not inserted in the ignition key cylinder may occur when an engine start is performed by the start device based on a radio communication, it is avoidable, in such a situation, that the warning is given by the theft preventing function due to such an engine start.

Other objects, features and advantages of the present invention will become more apparent from the following detailed description when read in conjunction with the accompanying drawings.

BEST MODE FOR CARRYING OUT THE INVENTION

Figure 1:
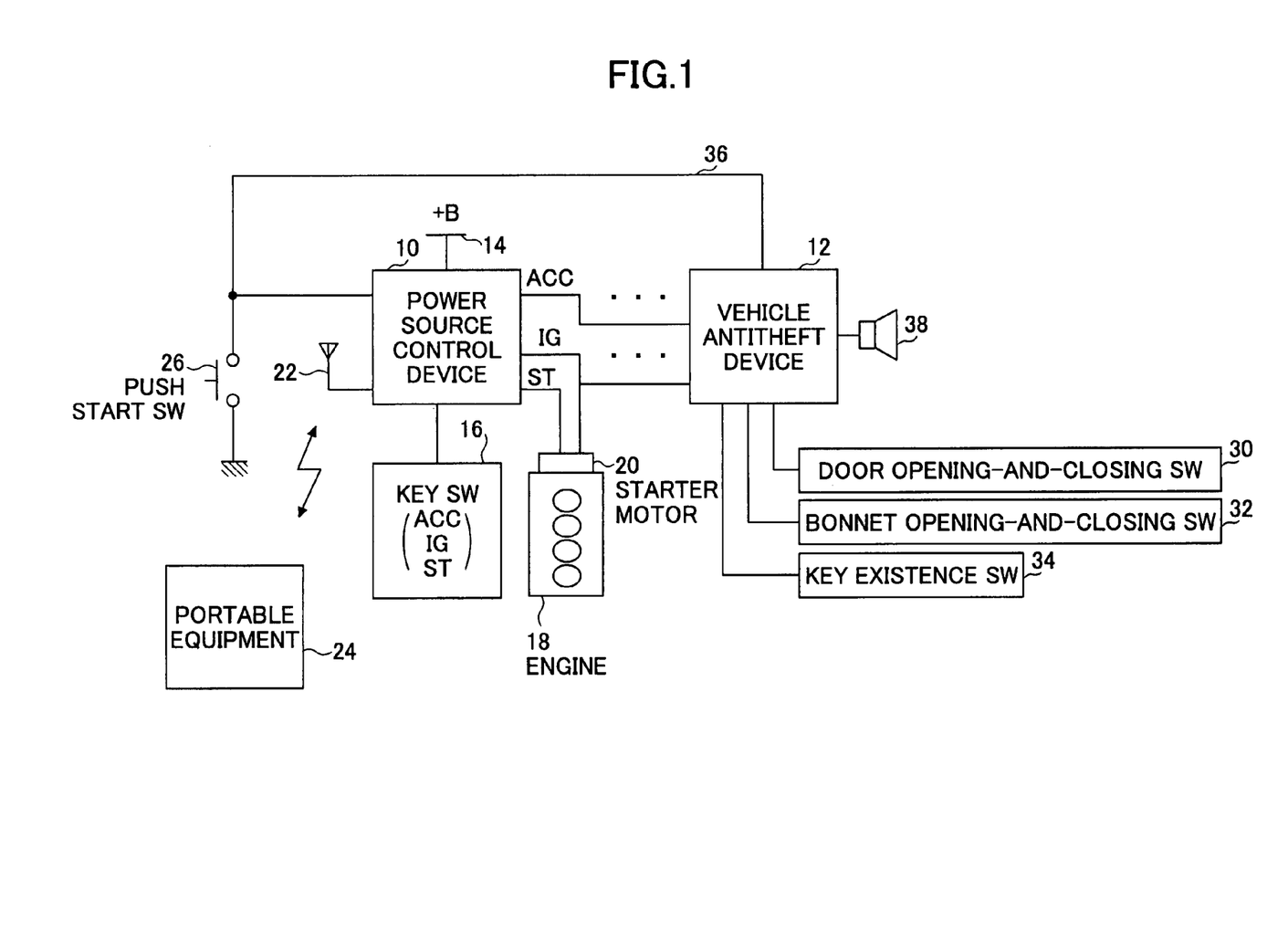
FIG. 1 is a structural diagram of a system mounted on a vehicle, which is an embodiment of the present invention.

FIG. 1 shows a structural diagram of a system, which is mounted on a vehicle, according to an embodiment of the present invention. In the present embodiment, as shown in FIG. 1, a vehicle is equipped with a power source control device 10 and a vehicle antitheft device 12. The power source control apparatus 10 is connected with an in-vehicle battery power source 14 and a key switch 16. The key switch 16 is provided to an ignition key cylinder into which an ignition key carried by a vehicle driver is inserted. The key switch 16 is equipped with an accessory switch (ACC switch), an ignition switch (IG switch) and a starter switch. The ACC switch, the IG switch and the starter switch are shifted to an ON state in that order by a driver normally rotating the ignition key inserted in the ignition key cylinder in that order, and shifted to an OFF state by reversely rotating the ignition key in a reverse order.

The power source control apparatus 10 is also connected with in-vehicle accessory equipments, engine electric parts such as a starter motor 20, which starts an engine 18 as a vehicle power source and ignition plugs, etc. The power source control apparatus 10 supplies an electric power of the battery power source 14 to the in-vehicle accessory equipments through an ACC terminal when the ACC switch of the key switch is changed into an ON state. Additionally, the power source control device 10 supplied an electric power of the battery power source 14 to the engine electric parts through an IG terminal when the IG switch is changed into an ON state. Further, the power source control device 10 supplies an electric power of the battery power source 14 to the starter motor 20 through an ST terminal when the starter switch is changed into an ON state.

The power source control device 10 is equipped with an in-vehicle transmitter and receiver having a transmitting and receiving antenna 22. The transmitting and receiving antenna 22 is located on a center console floor or a roof center in the vehicle, and has a transmissible area covering an entire area of the vehicle and receives at least a predetermined signal transmitted from inside the vehicle. Moreover, both the portable equipment 24, which a driver of a vehicle having a transmitting and receiving antenna carries, and the above-mentioned in-vehicle transmitter and receiver have memories for storing an identification code for distinguishing themselves. The in-vehicle transmitter and receiver of the power source control device 10 and the portable equipment 24 constitute a system for performing a power supply control of the vehicle on the assumption that the in-vehicle transmitter and receiver and the portable equipment 24 performed an identification code authentication collation (hereinafter, referred to as an inside-vehicle collation) with each other remotely, that is, without insertion of the ignition key into the ignition key cylinder.

It should be noted that the potable equipment 24 may constitute a system for controlling locking and unlocking of a door of a vehicle by performing an identification code authentication collation (hereinafter, referred to as an outside-vehicle collation) with each other remotely, that is, without insertion of the ignition key into the ignition key cylinder. That is, a system is constituted in which, when a vehicle driver who carries the portable equipment 24 approaches the vehicle corresponding to the portable equipment 24, a vehicle door is unlocked if the outside-vehicle collation matches, and when the vehicle driver moves away from the vehicle, the vehicle door is locked due to the outside-vehicle collation is not performed.

The power source control device 10 is also connected with a push start switch 26 provided in the vehicle so as to be operable by a vehicle driver. It should be noted that the push start switch 26 may be configured to be integral with the ignition key cylinder. The push start switch 26 is grounded when it is pressed down (pushed) so as to output an ON signal according to a ground voltage toward power source control device 10. The power source control device 10 determines existence of a push operation of the push start switch 26 based on the voltage which appears on a connected to the push start switch 26. Specifically, it is determined that the push start switch 26 is not operated when the grounding voltage does not appear, and it is determined that the push start switch 26 is operated by the vehicle driver when the grounding voltage appears.

In the above-mentioned power source control devicees 10, if it is determined that the push operation of the push start switch 26 is carried out under a situation where an electric power is not supplied by the battery power source 14, a request signal, which requests a response of the portable equipment 24, is transmitted first from the transmitting and receiving antenna 22. As mentioned above, the transmissible area of the transmitting and receiving antenna 22 covers the entire area of inside the vehicle. For this reason, if the driver who performed the push operation of the push start switch 26 carries the portable equipment 24 and the portable equipment 24 exists in the car, the portable equipment 24 receives the vehicle, the portable equipment 24 receives the request signal from the power source control device 10.

When the portable equipment 24 receives the request signal, the portable equipment 24 modulates the identification code of its own into a signal having high concealment, and transmits the modulated signal, as a response signal responding to the request signal of the power source control device 10, to the power source control device 10 through the transmitting and receiving antenna. The power source control device 10 determines whether or not the response signal from the portable equipment 24 is received after transmitting the request signal.

As a result of the above-mentioned determination, if the response signal from the portable equipment 24 is received, the power control apparatus 10 performs an authentication collation (inside vehicle collation), after interpreting the response signal, as to whether or not the identification code of the portable equipment contained in the response signal matches the identification code of its own. As a result, is it is determined that both the identification codes coincide with each other, it is regarded that the normal driver is in the vehicle, and an electric power of the battery power source 14 is supplied to the vehicle accessory equipments through the ACC terminal. On the other hand, when the response signal from the portable equipment 24 is not received after transmitting the request signal, and if it is determined that the identification code of the response signal, although it is received from the portable equipment 24, does not match the identification code of its own, the power source control device 10 does not perform an electric power supply to the in-vehicle accessory equipments so as to maintain the non-supply state.

Moreover, if it is determined that a push operation of the push start switch 26 is performed again (second time) under a situation where an electric power supply by the battery power source 14 to the in-vehicle accessory equipments is started due to the push operation of the push start switch 26, the request signal is transmitted again from the transmitting and receiving antenna 22 of the power source control device 10, and the response of the portable equipment 24 is requested.

Then, the power source control device 10 determines, after transmitting the request signal, whether or not the response signal transmitted by the portable equipment 24 in response to the request signal is received. As a result of the determination, if the response signal from the portable equipment 24 is received, the power source control device 10 performs an authentication collation between the identification code contained in the response signal and the identification of its own. Then, if both the identification code match, it is regarded that a normal driver is in the vehicle and an electric power by the battery power source 14 is supplied to the engine electric parts through the IG terminal. On the other hand, if the response signal from the portable equipment 24 is not received after transmitting the request signal, and if the identification code of the response signal from the portable equipment 24, although it is received, does not match the identification code of its own, the power source control device 10 does not perform an electric power supply to the engine electric parts and continues the electric power supply to the in-vehicle accessory equipments.

Moreover, if it is determined that a push operation of the push start switch 26 is performed again (third time) under a situation where an electric power supply by the battery power source 14 to the engine electric parts is started due to the push operation of the push start switch 26, the request signal is transmitted again from the transmitting and receiving antenna 22 of the power source control device 10, and the response of the portable equipment 24 is requested. It should be noted that it is preferable that the transmission of the request signal is performed only when a braking operation is being performed, and in such a structure, if the third push operation of the push start switch 26 is performed under a situation where the braking operation is not being performed, it is regarded that the operation is an OFF operation, and the electric power supply from the battery power source 14 through the electric power control apparatus 10 is stopped, and, thereby the electric power supply to the engine electric parts and the electric power supply to the in-vehicle accessory equipments are stopped.

Then, the power source control device 10 determines, after transmitting the request signal, whether or not the response signal transmitted by the portable equipment 24 is received in response to the request signal. As a result of the determination, if the response signal from the portable equipment 24 is received, the power source control device 10 performs an authentication collation between the identification code contained in the response signal and the identification of its own. Then, if both the identification code match, it is regarded that a normal driver is in the vehicle and an electric power by the battery power source 14 is supplied to starter motor 20 through the ST terminal only during a period where the push operation of the push start switch 26 continues. On the other hand, if the response signal from the portable equipment 24 is not received after transmitting the request signal, and if the identification code of the response signal from the portable equipment 24, although it is received, does not match the identification code of its own, the power source control device 10 does not perform an electric power supply to the starter motor 20 and continues the electric power supply to the engine electric parts.

Further, if it is determined that a push operation of the push start switch 26 is performed again (fourth time) under a situation where an electric power supply by the battery power source 14 to the starter motor 20 is started due to the push operation of the push start switch 26, the operation is regarded as an OFF operation and the electric power supply from the battery power source 14 through the electric power control apparatus 10 is stopped, and, thereby the electric power supply to the engine electric parts and the electric power supply to the in-vehicle accessory equipments are stopped.

Thus, each time when a push operation is performed on the push start switch 26 in a situation where an electric power by the battery power source 14 is not supplied, and upon completion of the inside-vehicle collation through a radio communication between the power source control device 10 as an in-vehicle equipment and the portable equipment 24 thereafter, the power source control device 10 can achieve the electric power supply to the in-vehicle accessory equipments through the ACC terminal, the electric power supply to the engine electric parts through the IG terminal and the electric power supply to the starter motor 20 through the ST terminal, sequentially in that order.

That is, in the present embodiment, the power source control device 10 can realize the electric power supply to the in-vehicle accessory equipments, the electric power supply to the engine electric parts and the electric power supply to the starter motor 20 in accordance with the ACC switch, the IG switch or the starter switch being changed to an ON state by a rotational operation of the ignition key inserted into the ignition key cylinder. Moreover, if the ignition key is not inserted into the ignition key cylinder, specifically, if the key switch 16 provided to the ignition key cylinder is not changed to an ON state, the power source control device 10 can achieve it by completion of the inside-vehicle collation through a radio communication with the portable equipment 24 after a push operation of the push start switch 26.

In the present embodiment, the vehicle antitheft device 12 is connected with a door opening-and-closing detection switch 30 provided to each vehicle door and a luggage door, a bonnet opening-and-closing detection switch 32 provided to a vehicle bonnet and a key existence detection switch 34 provided to the ignition key cylinder. The door opening-and-closing detection switch 30 outputs a signal according to the opening-and-closing state of each vehicle door and the luggage door. The bonnet opening-and-closing detection switch 32 outputs a signal according to the opening-and-closing state of the vehicle bonnet. Moreover, the key existence detection switch 34 outputs a signal according to whether or not the ignition key is inserted in the ignition key cylinder.

The output signals of the switches 30, 32 and 34 are supplied to the vehicle antitheft device 12, respectively. The vehicle antitheft device 12 detects an open and closes state of each vehicle door, the luggage door and the vehicle bonnet, and determines whether or not the ignition key is inserted in the ignition key cylinder.

The vehicle antitheft device 12 is also connected with the ACC terminal and the IG terminal of the power source control device 10. The vehicle antitheft device 12 determined whether the electric power supply to the in-vehicle accessory equipments and the electric power supply to the engine electric parts are performed based on the signals supplied from the ACC terminal and the IG terminal of the power source control device 10.

Further, the vehicle antitheft device 12 is connected with the above-mentioned push start switch 26 through a communication line 36 and also connected with an alarm 38 such as a horn or a lamp. The vehicle antitheft device 12 determines the existence of a push operation of the push start switch 26 based on a voltage which appears on a terminal connected to the push start switch 26. Moreover, the vehicle antitheft device 12 causes to activate the alarm 38 when there is a possibility of theft of the vehicle so as to prevent the vehicle from being thieved.

Specifically, in the vehicle antitheft device 12 of the present embodiment, first, if a vehicle door shifts from a locked state to an unlocked state due to the ignition key carried by the vehicle driver being inserted into the door key cylinder provided to a vehicle door or by completion of outside-vehicle collation through a radio communication between the portable equipment 24 carried by the vehicle driver and the in-vehicle equipment, it is regarded that there is no possibility of an occurrence of vehicle theft and a state (hereinafter, referred to as an unvigilant state) where an activation of the alarm 38 is limited or prohibited is achieved. If, in the unvigilant state, a state where the ignition key is not inserted in the ignition key cylinder and all of the vehicle doors, the luggage door and the vehicle bonnet door are closed and locked continued for a predetermined time period (for example, 30 msec), a state (hereinafter, referred to as a vigilant state) where an activation of the alarm 38 is permitted is achieved.

In the above-mentioned vigilant state, the alarm 38 is activated as there is a possibility of occurrence of vehicle theft, and a horn is intermittently honked and a hazard warning lamp is blinked (the vigilant state) if 1) a vehicle door or a luggage door is unlocked without insertion of the ignition key into the ignition key cylinder and completion of the outside-vehicle collation between the portable equipment 24 and the in-vehicle equipment through a radio communication, 2) if a detection is made by the door opening-and-closing switch 30 and the bonnet opening-and-closing switch 32 that each door or the vehicle bonnet is in an opened state, or 3) if it is determined that the signal supplied from the IG terminal is set to an IG ON state in a state where it is determined by the key existence detection switch 34 that the ignition key is not inserted in the ignition key cylinder.

On the other hand, if the vehicle doors are unlocked according to an operation of the ignition key while being inserted into a door key cylinder or completion of the outside-vehicle collation between the portable equipment 24 and the in-vehicle equipment through a radio communication, or if it is determined that IG signal is set to the IG ON state in a state where the ignition key is inserted in the ignition key cylinder while the vigilant state is set, it is regarded that there is no possibility of occurrence of vehicle theft and an activation of the alarm 38 is limited or prohibited.

Therefore, according to the vehicle antitheft device 12 of the present embodiment, the vehicle itself or a thing existing in the vehicle is prevented from being thieved by actuating the alarm 38 if one of the conditions indicated by the above-mentioned 1) through 3) is established by the vehicle door, the luggage door or the vehicle bonnet being unlocked or opened by a method other than a normal method or the IG signal being set to the ON state in a state where the ignition key is not inserted in the ignition key cylinder.

Figure 2:
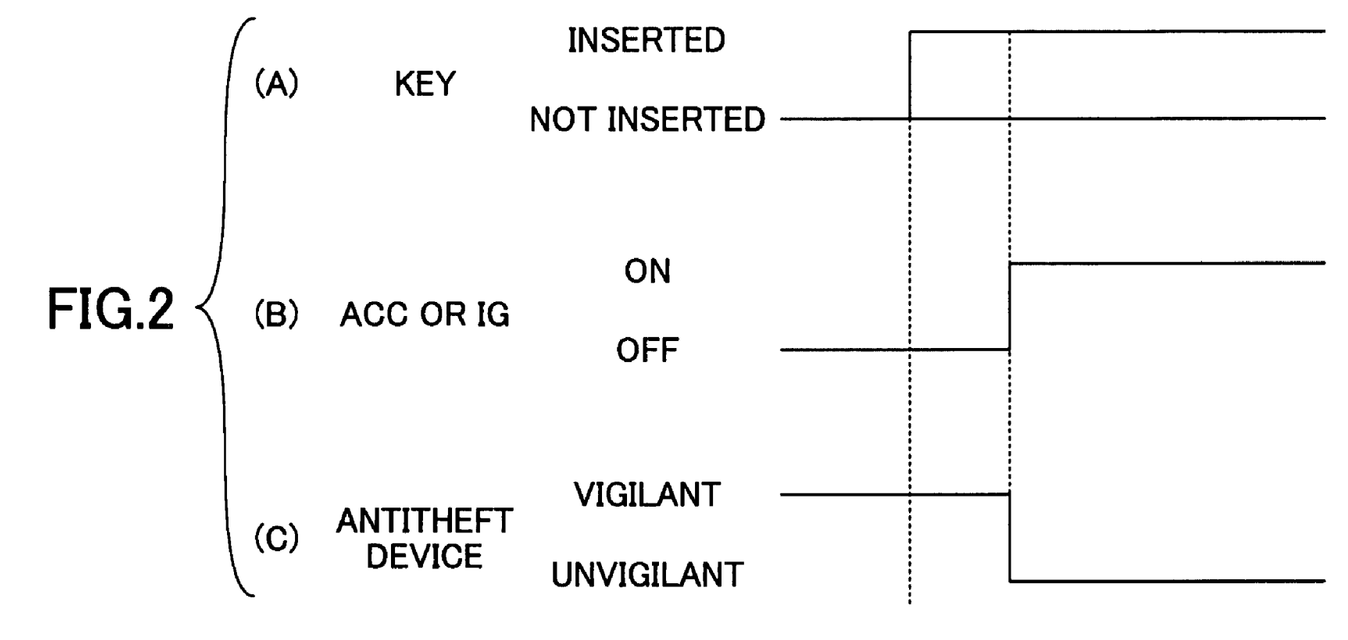
FIG. 2 is an operation time chart of a process when a mechanical engine start is performed in the system shown in FIG. 1.

FIG. 2 shows an example of an operation time chart of a process realized when the engine 18 is started mechanically (that is, by a rotational operation of the ignition key inserted in the ignition cylinder) in the system of the present embodiment. As mentioned above, the alarm 38 is activated as there is a possibility of occurrence of vehicle theft if the IG signal is set to the IG ON state while the ignition key is not inserted in the ignition key cylinder in the vigilant state. On the other hand, if the IG signal is set to the IG ON state in the state where the ignition key is inserted in the ignition key cylinder as shown in FIG. 2 in the vigilant state, it is regarded that there is no possibility of occurrence of vehicle theft and the unvigilant state is realized so that the an activation of the alarm 38 is limited or prohibited. Therefore, a situation in which the alarm 38 is erroneously activated will never occur when a normal, mechanical engine start is performed.

However, in the present embodiment, an engine start is performed in accordance with a result of the authentication collation between the power source control device 10 and the portable equipment 24 through a radio communication after a push operation of the push start switch 26. When the engine start is performed based on the result of authentication collation through the radio communication, the ignition key is not inserted in the ignition key cylinder. Therefore, a situation where the alarm 38 is erroneously activated may occur.

Thus, in the present embodiment, by avoiding occurrence of such a situation, the security function of the vehicle antitheft device 12 is prevented from being erroneously activated due to an engine start even if the engine start is performed based on a result of an authentication collation between the power source control device 10 and the portable equipment 24 after a push operation. Hereafter, a description will be given of the present embodiment with reference to FIG. 3 and FIG. 4.

Figure 3:
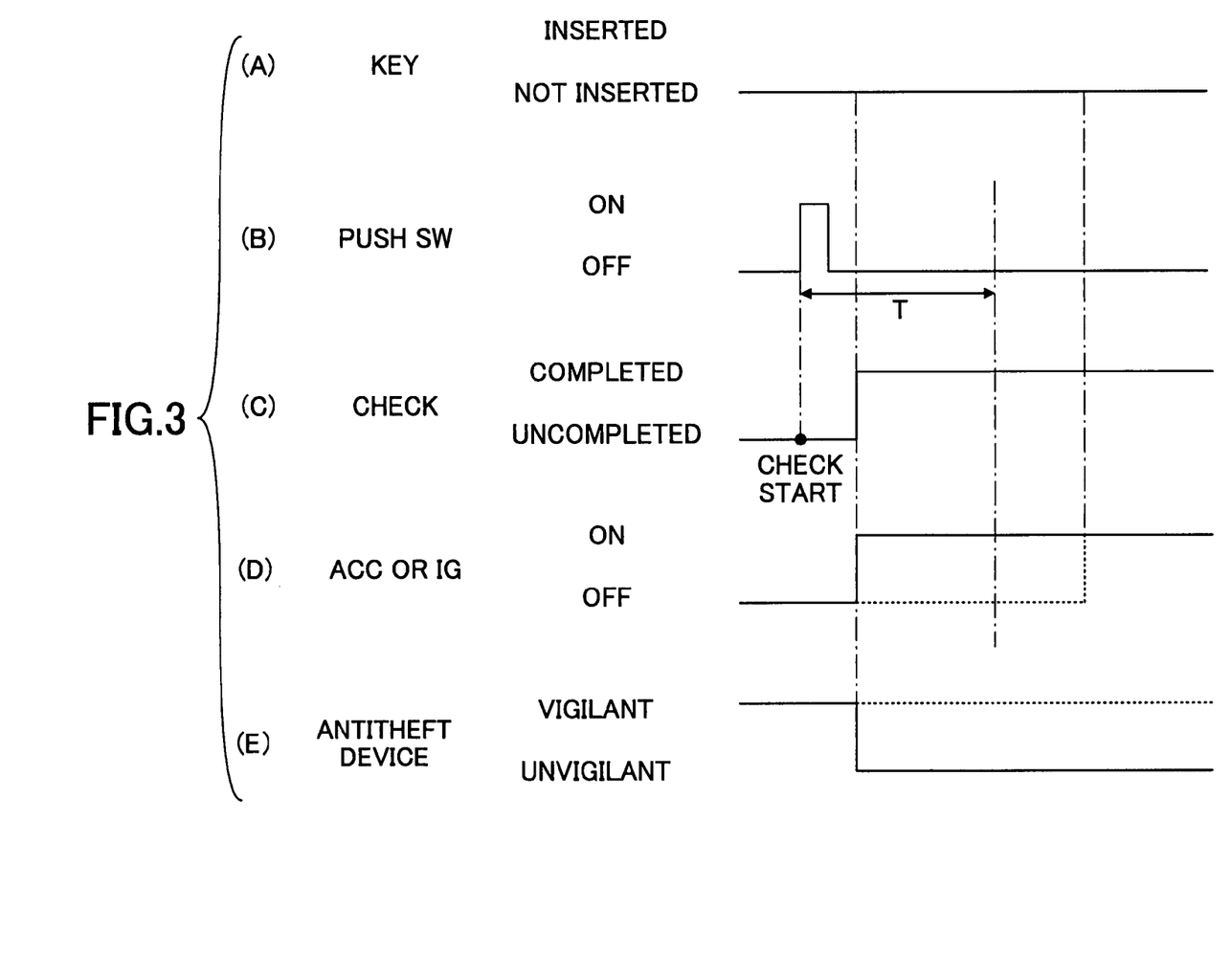
FIG. 3 is an operation time chart of a process when an engine start is performed based on a result of an authentication collation according to a radio communication.

FIG. 3 shows an example of an operation time chart realized when the engine 18 is started based on a result of authentication collation through radio communication in the system of the present embodiment. In the present embodiment, the push start switch 26, which is push-operated when the engine 18 is remote-operated, is connected to the vehicle antitheft device 12 through the communication line 36. For this reason, the vehicle antitheft device 12 can determine whether or not the remote starting of the engine 18 is performed based on a state of the push start switch 26. Moreover, at the time of engine starting based on a result of the authentication collation through a radio communication, the ACC signal and the IG signal, which are output from the power source control device 10, are set to an ON state when the authentication collation between the power source control device 10 and the portable equipment 24 through a radio communication is completed, and is set to an OFF state when the authentication collation is not completed.

In the present embodiment, as shown in FIG. 3, the unvigilant state is realized as there is no possibility of occurrence of vehicle theft also in a case where the ACC signal supplied to the vehicle antitheft device 12 from the power source control device 10 is set to an ON state, that is, in a case where an electric current supply to the in-vehicle accessory equipments is started after the push start switch 26 is push-operated. The ON state of the ACC signal is realized before the IG ON state of the IG signal, which is a condition of the alarm 38 being activated, is realized. Therefore, in the vehicle antitheft device 12, when the engine start is performed according to the push operation of the push start switch 26, the switching from the vigilant state to the unvigilant state is performed before the IG signal is changed to the IG ON state in a state where the ignition key is not inserted in the ignition key cylinder, that is, before an activation of the alarm 38 is started due to the state.

In the vehicle antitheft device 12, an activation of the alarm 38 is limited or prohibited in the unvigilant state. For this reason, when an engine start is performed based on a result of the authentication collation between the power source control device 10 and the portable equipment 24 through a radio communication after a push operation of the push start switch 26 is performed, an activation of the alarm 38 due to establishment of a condition where the IG signal is changed to the IG ON state in a state where the ignition key is not inserted in the ignition key cylinder can be avoided.

It should be noted that, in order to shift the ACC signal from the ON state to the OFF state after a push operation of the push start switch 26, it is necessary to complete the authentication collation between the power source control device 10 and the portable equipment 24 through a radio communication, but such an authentication is completed normally in a short time (at most about 10 seconds) after a start thereof. Therefore, if the change from the vigilant state to the unvigilant state is performed without limitation regardless of a time when the ACC signal supplied to the vehicle antitheft device 12 from the power source control device 10 is changed to the ON state after a push operation of the push start switch 26 is performed, there is invited deterioration of anti-theft property, which is acquired by an activation of the security function in the vehicle antitheft device 12.

Thus, in the present embodiment, the realization of the unvigilant state from the vigilant state as there is no possibility of occurrence of vehicle theft is limited to the case where the ACC signal supplied to the vehicle antitheft device 12 from the power source control device 10 is changed to the ON state within a predetermined time period T after a push operation of the push start switch 26 is started. That is, the change from the vigilant state to the unvigilant state is not performed even if the ACC signal is changed to the ON state after the predetermined time period T has passed after the push operation of the push start switch 26. Therefore, an erroneous activation of the alarm 38 due to an engine start based on a result of authentication collation through a radio communication can be avoided while anti-theft property by an activation of the security function of the vehicle antitheft device 12 is maintained high.

Figure 4:
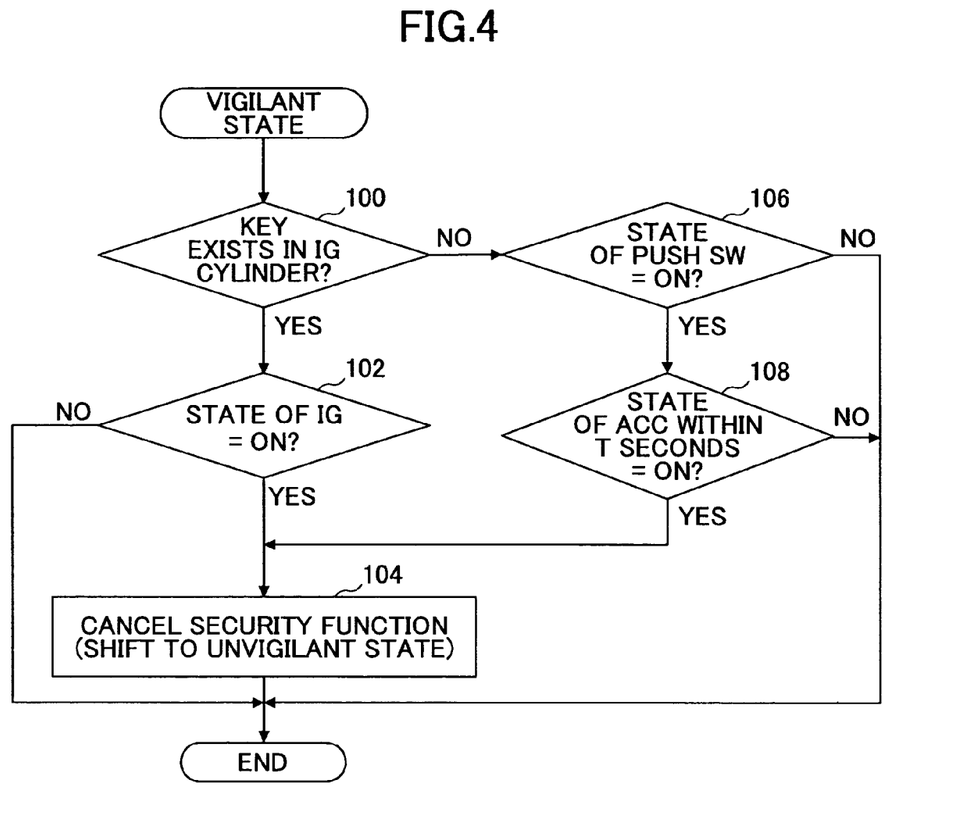
FIG. 4 is a flowchart of a control routine executed in a vehicle antitheft device of the system shown in FIG. 1.

FIG. 4 is a flowchart of an example of a control routine, which the vehicle antitheft device 12 performs in the present embodiment so as to realize the above-mentioned function. The routine shown in FIG. 4 is repeatedly started, when the vigilant state is achieved with respect to the security function of the vehicle antitheft device 12. When the routine shown in FIG. 4 is started, the process of step 100 is performed first.

In step 100, it is determined whether the ignition key is inserted in the ignition key cylinder based on the output signal of the key existence detection switch 34. When it is determined that the ignition key is inserted in the ignition key cylinder, the process of step 102 is performed. On the other hand, if it is determined that the ignition key is not inserted in the ignition key cylinder, the process of step 106 is performed.

In step 102, it is determined whether or not the IG signal supplied from the power source control device 10 is in the IG ON state. Consequently, if it is determined that the IG signal is not in the IG ON state, the routine at this time is ended. On the other hand, if it is determined that the IG signal is in the IG ON state, the process of step 104 is performed.

In step 104, the security function, which permits an activation of the alarm 38, is cancelled, and a process for changing into the unvigilant state is performed so that the activation is limited or prohibited. When the process of step 104 is performed, thereafter, an activation of the alarm 38 is limited or prohibited. After the process of the step 104 is ended, the routine at this time is ended.

In step 106, it is determined whether or not the state of the push start switch 26 is in the ON state due to a push operation being performed. Consequently, if it is determined that the OFF state is achieved, the routine at this time is ended. On the other hand, if it is determined that the ON state is achieved, the process of step S108 is performed.

In step 108, it is determined whether or not the ACC signal supplied from the power source control device 10 is changed to the ON state within the predetermined time period T seconds (for example, 10 seconds) after it is determined that the state of the push start switch 26 is in the ON state in the above-mentioned step 106. Consequently, if it is determined that the ACC signal has not changed into the ON state within the predetermined time period T seconds, the routine at this time is ended. On the other hand, when the ACC signal has changed into the ON state within the predetermined time period T seconds, then, a process of canceling the security function, which permits an activation of the alarm 38, and changing into the unvigilant state is performed so that the activation is limited or prohibited.

According to the routine shown in FIG. 4, in the case where the IG signal supplied from the power source control device 10 is changed into the ON state in a state where the ignition key is inserted in the ignition key, and even in the state where the ignition key is not inserted in the ignition key cylinder, an activation of the alarm 38 can be limited or prohibited by canceling the security function to achieve the unvigilant state in the case where the ACC signal supplied from the power source control device 10 has changed into the ON state within the predetermined time period T seconds after a push operation of the push start switch 26 is started.

In the above-mentioned structure, the change from the vigilant state to the unvigilant state is performed with respect to the security function of the vehicle antitheft device 12 before the situation where the IG signal is changed to the IG ON state in a state where the ignition key is not inserted in the ignition key cylinder so that an activation of the alarm 38 caused by the establishment of the situation is limited or prohibited. Therefore, according to the system of the present embodiment, even after the security function of the vehicle antitheft device 12 set to the vigilant state in a state where a vehicle driver is in the vehicle, it can be prevented that a determination is made that there is a possibility of occurrence of vehicle theft due to establishment of the condition where the IG signal is changed into the IG ON state in the state where the ignition key is not inserted in the ignition key cylinder, which can avoid an erroneous activation of the alarm 38.

Moreover, the change from the unvigilant state to the vigilant state when performing an engine start according to the radio communication between the power source control device 10 and the portable equipment 24 is achieved only when the ACC signal supplied from the power source control device 10 is changed into the ON state within the predetermined time period T seconds after a push operation of the push start switch 26 is started. Therefore, according to the system of the present embodiment, it is possible to avoid an erroneous activation of the alarm 38 due to an engine start based on a result of authentication collation through a radio communication while maintaining a high anti-theft property by the security function of the vehicle antitheft device 12.

It should be noted that, in the above-mentioned embodiment, the power source control device 10 and the starter motor 20 correspond to "starting device", "in-vehicle equipment current supplying means" and "mechanical start device". Moreover, the push start switch 26 corresponds to "start operation means", "start switch" and "push-type start switch". Furthermore, "activation limiting means" is achieved by the vehicle antitheft device 12 performing the process of step 104 after performing the process of steps 106 and 108 in the routine shown in FIG. 4.

In the meantime, although the authentication collation according to a radio communication between the power source control device 10 and the portable equipment 24 is started at a time when a push operation of the push start switch 26 is started and the state thereof is changed from On to OFF in the above-mentioned embodiment, it may be started at a time when the state of the push start switch 26 is changed from ON to OFF after a push operation of the push start switch 26 is performed and the state thereof is changed from OFF to ON. In this case, the security function of the vehicle antitheft device 12 may be changed from the vigilant state to the unvigilant state when the ACC signal is changed to the ON state within the predetermined time period T after the state of the push start switch 26 is changed form ON to OFF.

Moreover, although an authentication collation is performed between the power source control device 10 and the portable equipment 24 through a radio communication each time when a push operation of the push start switch 26 is performed so as to perform an electric power supply to the in-vehicle accessory equipments, an electric power supply to the engine electric parts and an electric power supply to the starter motor 20 in the above-mentioned embodiment, the collation between the power source control device 10 and the portable equipment 24 through a radio communication may be performed once when a first push operation of the push start switch 26 is performed so as to perform an electric power supply to the in-vehicle accessory equipments, and, thereafter, when a push operation of the push start switch 26 is performed within a predetermined time period, an electric power supply to the engine electric parts and the starter motor 20 may be performed without performing the above-mentioned collation.

Moreover, although, in order to perform the electric power supply to the starter motor 20 under a situation where an electric power supply from the battery power source 14 through the power source control device 10 in the above-mentioned embodiment, it is necessary for a vehicle driver to perform a push operation of the push start switch 26 for a plurality of times, a push operation of the push start switch 26 may be performed only once under the situation where an electric power supply from the battery power source 14 through the power source control device 10 is not performed so that an electric power supply to the in-vehicle accessory equipments, an electric power supply to the engine electric parts and an electric power supply to the starter motor 20 are achieved in that order.

Moreover, although the collation between the power source control device 10 and the portable equipment 24 through a radio communication is performed after a push operation of the push start switch 26 is performed and if the collation is completed, an electric power supply to the in-vehicle accessory equipments, an electric power supply to the engine electric parts or an electric power supply to the starter motor 20 is performed in the above-mentioned embodiment, the electric power supply to the in-vehicle accessory equipments, the electric power supply to the engine electric parts or the electric power supply to the starter motor 20 may be performed at the time when the push operation is performed without performing the collation through a radio communication after the push operation is performed if the collation between the power source control device 10 and the portable equipment 24 is completed within a predetermined time period before the push operation of the push start switch 26 is performed.

Moreover, although it is enough for a vehicle driver to perform a push operation of the push start switch 26 to achieve an electric power supply to the in-vehicle accessory equipment, an electric power supply to the engine electric parts and an electric power supply to the starter motor 20 in the above-mentioned embodiment, a push-dial-type start switch, which is capable of performing a rotational operation to accessory ON, IG ON and starter ON when a push operation is performed or without a push operation, may be provided instead of the push start switch 26. That is, an electric power supply is performed when the start switch is changed to the accessory ON state on the assumption that the collation is completed, an electric power supply to the engine electric parts is performed when the start switch is changed to the IG ON state on the assumption that the collation is completed, and an electric power supply to the starter motor is performed when the start switch is changed to the starter ON state on the assumption that the collation is completed.

Further, although the unvigilant state is achieved, in the above-mentioned embodiment, as there is no possibility of occurrence of vehicle theft in the case where the ACC signal supplied to the vehicle antitheft device 12 from the power source control device 10 is changed to the ON state after a push operation of the push start switch 26 is performed when an engine start is performed based on a result of authentication collation through a radio communication in the vehicle antitheft device 12 in which the alarm 38 is activated when a condition where the IG signal is changed to the IG ON state in a state where the ignition key is not inserted in the ignition key cylinder, the shift from the vigilant state to the unvigilant state may be performed assuming that there is no possibility of occurrence of vehicle theft at the time when the IG signal supplied from the power source control device 10 to the vehicle antitheft device 12 is changed to the ON state after a push operation of the push start switch 26 is performed. In this structure, the vehicle antitheft device 12 permits an activation of the alarm 38 when the vigilant state is maintained if a predetermined delay time is passed after establishment of the situation where the IG signal is in the IG ON state in a state where the ignition key is not inserted in the ignition key cylinder. Also in this case, it becomes possible to avoid an erroneous activation of the alarm 38 due to an engine start based on a result of authentication collation through a radio communication.

Moreover, although the vehicle antitheft device 12 causes the alarm 38 to be activated when a situation where the IG signal is changed to the IG ON state is established in a state where the ignition key is not inserted in the ignition key cylinder in the above-mentioned embodiment, such an activation of the alarm 38 is also applicable to a structure in which the alarm 38 is activated in a situation where the ACC signal is changed to the ON state or the ST signal supplied to the starter motor 20 is changed to the ON in a state where the ignition key is not inserted in the ignition key cylinder. In this structure, it becomes possible to avoid an erroneous operation of the alarm 38 due to an engine start based on a result of authentication collation through a radio communication if the change from the vigilant state to the unvigilant state is achieved assuming that there is no possibility of occurrence of vehicle theft in a case where the ACC signal, the IG signal or the ST signal supplied from the power source control device 10 to the vehicle antitheft device 12 is changed to the ON state after a push operation of the push start switch 26 is performed when an engine start based on a result of authentication collation through a radio communication is performed.

The present invention is not limited to the above-mentioned specifically disclosed embodiments, and variations and modifications may be made within the scope of the present invention.

The invention claimed is:

1. A vehicle antitheft device mounted on a vehicle having a starter that starts an engine after in-vehicle equipment checks a radio signal from portable equipment by collation, the vehicle antitheft device comprising:
    an actuator to actuate a predetermined theft preventing function;
    a supplier to supply an electric current to in-vehicle electric equipment other than the starter, after said collation is completed but before electric current is sent to the starter; and
    a limiter to limit activation of said predetermined theft preventing function when a current is first supplied to said in-vehicle electric equipment.

2. The vehicle antitheft device as claimed in claim 1, wherein
    said start operation means is a start switch that is operated to be a current supply permitting state to said in-vehicle electric equipment and a start permitting state of the engine stepwisely in that order;
    said in-vehicle equipment current supplying means permits a current supply to said in-vehicle electric equipment by being operated to be in the current supply permitting state to said in-vehicle electric equipment; and
    said activation limiting means limits said predetermined theft preventing function when the current supply to said in-vehicle electric equipment by said in-vehicle equipment current supplying means is started within a predetermined time period after said start operation means is operated to be in the current supply permitting state to said in-vehicle electric equipment.

3. The vehicle antitheft device as claimed in claim 2, wherein said start operation means is a push-type start switch, provided in the vehicle, which is pressed down by a vehicle driver.

4. The vehicle antitheft device as claimed in claim 3, wherein the vehicle is equipped with a mechanical start device that starts the engine when an ignition operation is performed in a state where a key is inserted in an ignition key cylinder, and said predetermined theft preventing function includes at least a function to give warning when a turn-on of an ignition is detected in a state where said key is not inserted in said ignition key cylinder.

5. The vehicle antitheft device as claimed in claim 2, wherein the vehicle is equipped with a mechanical start device that starts the engine when an ignition operation is performed in a state where a key is inserted in an ignition key cylinder, and said predetermined theft preventing function includes at least a function to give warning when a turn-on of an ignition is detected in a state where said key is not inserted in said ignition key cylinder.

6. The vehicle antitheft device as claimed in claim 1, wherein said start operation means is a momentary-contact switch, provided in the vehicle, which is pressed by a vehicle driver.

7. The vehicle antitheft device as claimed in claim 6, wherein the vehicle is equipped with a mechanical start device that starts the engine when an ignition operation is performed in a state where a key is inserted in an ignition key cylinder, and said predetermined theft preventing function includes at least a function to give warning when a turn-on of an ignition is detected in a state where said key is not inserted in said ignition key cylinder.

8. The vehicle antitheft device as claimed in claim 1, wherein the vehicle is equipped with a mechanical start device that starts the engine when an ignition operation is performed in a state where a key is inserted in an ignition key cylinder, and said predetermined theft preventing function includes at least a function to give warning when a turn-on of an ignition is detected in a state where said key is not inserted in said ignition key cylinder.

* * * * *